(12) United States Patent
Joyner et al.

(10) Patent No.: US 12,245,555 B2
(45) Date of Patent: Mar. 11, 2025

(54) SYSTEM AND METHOD FOR PLANT INDEXING IN A HYDROPONIC FARMING ENVIRONMENT AND A HYDROPONIC FARMING ENVIRONMENT

(71) Applicant: Local Bounti Operating Company, LLC, Hamilton, MT (US)

(72) Inventors: Travis M. Joyner, Hamilton, MT (US); Ryan Sweeney, Hamilton, MT (US); Jeff Leggott, Hamilton, MT (US)

(73) Assignee: Local Bounti Operating Company LLC, Hamilton, MT (US)

( * ) Notice: Subject to any disclaimer, the term of this patent is extended or adjusted under 35 U.S.C. 154(b) by 0 days.

(21) Appl. No.: 18/406,321

(22) Filed: Jan. 8, 2024

(65) Prior Publication Data
US 2024/0138327 A1     May 2, 2024

Related U.S. Application Data

(63) Continuation of application No. 17/341,718, filed on Jun. 8, 2021, now Pat. No. 11,895,954.
(Continued)

(51) Int. Cl.
*A01G 31/04* (2006.01)
*A01C 1/02* (2006.01)
(Continued)

(52) U.S. Cl.
CPC .............. *A01G 31/042* (2013.01); *A01C 1/02* (2013.01); *A01C 21/00* (2013.01); *A01G 9/14* (2013.01)

(58) Field of Classification Search
CPC ........ A01G 31/042; A01G 9/14; A01C 21/00; A01C 1/02
See application file for complete search history.

(56) References Cited

U.S. PATENT DOCUMENTS

| 6,508,033 | B2 * | 1/2003 | Hessel | A01C 7/04 |
| | | | | 47/60 |
| 7,702,597 | B2 * | 4/2010 | Singh | G06Q 10/04 |
| | | | | 706/21 |

(Continued)

OTHER PUBLICATIONS

Notification of Transmittal of the International Search Report and the Written Opinion of the International Searching Authority, or the Declaration issued on Nov. 9, 2021, in connection with corresponding International application No. PCT/US 21/43142; 9 pages.

(Continued)

*Primary Examiner* — Monica L Perry
*Assistant Examiner* — Aaron M Rodziwicz
(74) *Attorney, Agent, or Firm* — Maier & Maier, PLLC

(57) ABSTRACT

A farming method may be shown and described. In an exemplary embodiment, plants may begin in a germination phase. Next, plants are brought to a nursery for a period of time before optionally being transplanted to one or more subsequent nurseries. Finally, plants are transplanted to a greenhouse where they may grow until they are ready for harvest. In an exemplary embodiment, the nursery phases may be vertical farms while the greenhouse phase may be a traditional, hydroponic, or other type of farm which may receive sunlight. AI may be implemented to optimize environmental conditions and robotics may be used to harvest the plants. Plants may be indexed to efficiently expedite plant growth and optimize the time and plant density/spacing in each phase.

20 Claims, 11 Drawing Sheets

Related U.S. Application Data

(60) Provisional application No. 63/062,609, filed on Aug. 7, 2020.

(51) Int. Cl.
  *A01C 21/00* (2006.01)
  *A01G 9/14* (2006.01)

(56) References Cited

U.S. PATENT DOCUMENTS

| | | | |
|---|---|---|---|
| 10,225,993 B2 * | 3/2019 | Alexander | G05D 1/0287 |
| 2002/0088173 A1 * | 7/2002 | Hessel | A01B 79/005 |
| | | | 47/60 |
| 2011/0131876 A1 * | 6/2011 | Pettibone | A01G 31/042 |
| | | | 110/255 |
| 2015/0027048 A1 * | 1/2015 | Fok | A01C 14/00 |
| | | | 47/66.7 |
| 2015/0264858 A1 * | 9/2015 | Chan | A01B 79/005 |
| | | | 700/275 |
| 2018/0295783 A1 | 10/2018 | Alexander et al. | |
| 2019/0327913 A1 * | 10/2019 | Chong | G06N 5/02 |

OTHER PUBLICATIONS

Extended European Search Report issued on Mar. 4, 2024, in corresponding European Application No. 23198751.2, 11 pages.

* cited by examiner

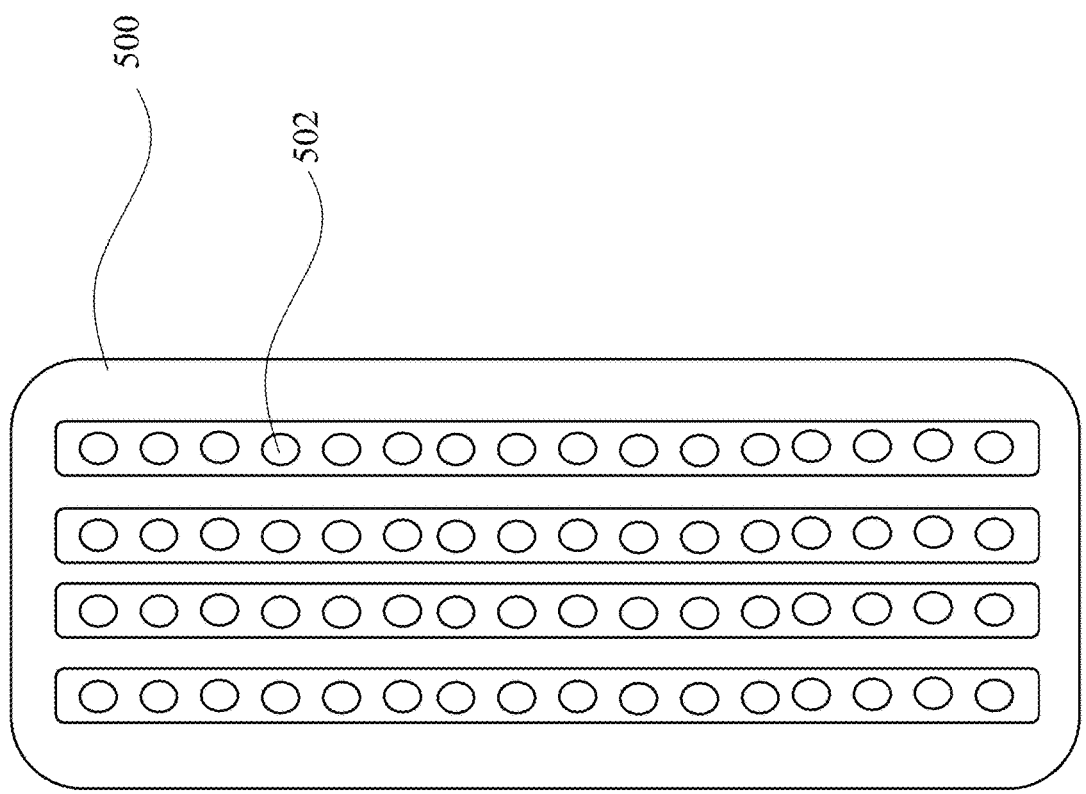

SYSTEM AND METHOD FOR PLANT INDEXING IN A HYDROPONIC FARMING ENVIRONMENT AND A HYDROPONIC FARMING ENVIRONMENT

CROSS-REFERENCE TO RELATED APPLICATIONS

The present patent application is a continuation of U.S. application Ser. No. 17/341,718, filed on Jun. 8, 2021 which claims benefit and priority to U.S. Provisional Patent Application No. 63/062,609 entitled "SYSTEM AND METHOD FOR PLANT INDEXING IN A HYDROPONIC FARMING ENVIRONMENT AND A HYDROPONIC FARMING ENVIRONMENT" filed on Aug. 7, 2020, which is hereby incorporated by reference into the present disclosure.

FIELD

An exemplary embodiment relates to the field of farming.

BACKGROUND

Conventional agriculture presents a number of problems. Large areas of space and large amounts of water are typically required. The advent of Controlled Environment Agriculture (CEA) has addressed these problems. CEA can reduce water usage and land by as much as 90%. Further, this allows for a 365-day growing season. CEA has a significantly smaller footprint with a significantly higher yield compared to conventional agriculture. The use of a controlled environment, where factors such as light and other environmental conditions can be precisely specified, allows for such improvements.

However, CEA still faces a number of challenges. For example, there is a risk of crop failure and a high risk of disease and virus outbreak. Further, these farms are typically less flexible in what products they can farm. They may require higher capital expenditures and operational expenses. Further, traditional farms plant seedlings spread apart in order to allow them to grow with a proper amount of space. As a result, there is a large amount of unused "white-space" that is only used when the plant reaches maturity. To maximize efficiency, some CEA farm facilities may implement vertical farming, where crops are grown in vertically stacked layers. In vertical farms, metal reflectors and LED lights substitute natural light in these densely packed farms. Vertical farming produces a high yield per square foot while also requiring less water due to implementation of hydroponic farming techniques. However, vertical farms still face challenges such as a high risk of crop failure, low product flexibility, and a heavy mechanical dependence leading to high capital and operational costs to build and operate.

SUMMARY

According to at least one exemplary embodiment, a method, and system for a hydroponic vertical farm may be shown and described.

A system and method for farming plants planting seeds or seedlings, and growing the seeds or seedlings into plants in a germination phase; transporting the plants to a nursery in one or more nursery phases. The plants may be arranged vertically and receive light from artificial light sources in each nursery phase. The method may continue with transplanting the plants to a greenhouse, where the plants in the greenhouse may be horizontally arranged in a greenhouse phase, and where, during the greenhouse phase, the plants receive sunlight; and harvesting the plants from the greenhouse; adjusting, by a control unit, a plurality of plant parameters; where the step of adjusting the plant parameters occurs during one or more of the germination phase, the one or more nursery phases and the greenhouse phase, and where the control unit is configured to adjust the plant parameters differently according to requirements of each of the germination phase, nursery phase(s), and greenhouse phase.

In an embodiment, a hydroponic farm may implement a germination phase, multiple vertical/indoor nurseries, and finally a greenhouse phase. Crops may be initially seeded in the germination phase. Next, the plants may be brought to a vertical nursery, where they may grow for a period of time. Optionally, some of the plants may then be transplanted to one or more subsequent nurseries with different plant indexing density and duration or residence time in the nurseries or greenhouses. In certain embodiments, some or all of the plants from a first nursery may be transplanted to one or more subsequent nurseries. In alternative embodiments, the size and environmental conditions of the nurseries may vary to accommodate the change in density and duration.

By indexing plants differently from nurseries, physical space, time, and operating cost are optimized for the plants' early growth cycle. Nurseries may be vertically set up such that plants are arranged in an indoor vertical farm. Next, the plants may be transplanted to a greenhouse for the final phase of their growth. In an exemplary embodiment, the greenhouse may not be vertically arranged, and the plants may instead be arranged horizontally or flat in order to receive natural sunlight. They may be harvested from the greenhouse at an optimal time.

An exemplary embodiment may implement a control system to process data and automate the system. For example, the control system may be implemented to monitor the lifecycle of a plant as well as environmental data, such as light, temperature, humidity, and the like. In an exemplary embodiment, the control system may be, for example, a programmable logic controller (PLC) system. The control system may incorporate artificial intelligence (AI) algorithms to optimize and control the environmental parameters. The AI algorithm may be any program known in the field, such as a machine learning algorithm and the like. Thermal, electronic, moisture, nutrient, and temperature sensors, may feed data to the control system. The thermal, electronic, moisture, nutrient, and temperature sensors may include various sensors that would be understood by a person having ordinary skill in the art. For example, water temperature, soil moisture, electrical conductivity, pH, and dissolved oxygen may be measured from the plants and the environment. Air temperature, relative humidity, $CO_2$ content, light intensity (or photosynthetically available radiation, PAR), and air velocity may be measured from the environment. Any other measurement may be contemplated as well. The control system may then process the input data, such as via an AI, to then identify which environmental parameters should be altered or modified to optimize the plant growth. An exemplary control system AI may implement machine learning, for example, based on an algorithmic driven regression formula.

Different plants may be grown in different nurseries or greenhouses, and the system may optimize each plant's environmental parameters individually, since some plants may require or flourish under different conditions than others. Image recognition, thermal imaging, and LIDAR (light detection and ranging) may be implemented in order to determine factors such as moisture content or size of the plant. For example, in the greenhouse phase, LIDAR data may identify that a plant has reached its target size and is ready for harvest. LIDAR may be used in an exemplary embodiment; however, alternative ranging, image recognition, and thermal imaging technologies may be used, as would be understood by a person having ordinary skill in the art. An exemplary embodiment may implement any type of sensor, such as a biosensor, biochemical, image, and/or metal-oxide semiconductor (MOS) sensor. Alternatively, it may be contemplated that data is retrieved from a separate system or is manually entered into the system.

In a further exemplary embodiment, robotics may be implemented to harvest plants. Thus, the entire process may be executed autonomously via the control unit AI and the robotic units. In an exemplary embodiment, a robotic arm or fingers may be implemented to extract an individual plant and package the plant for a sale. Large amounts of plants may be similarly harvested or extracted.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 5A is an exemplary embodiment of a greenhouse hydroponic plant vessel.

DETAILED DESCRIPTION

Figure 1:
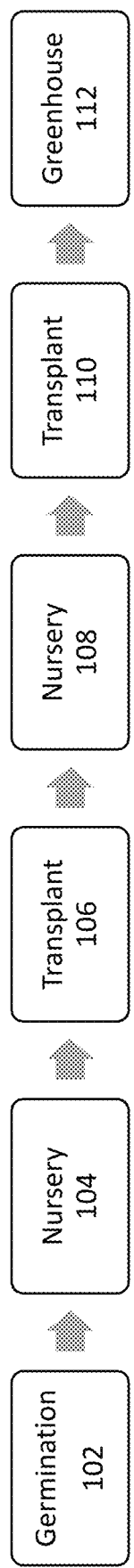
FIG. 1 is an exemplary schematic flowchart of an exemplary farming process.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

A method for efficiently growing crops may be shown and described. In an exemplary embodiment, plants may be indexed to enable optimal growth and density. Each plant may be indexed throughout its entire lifecycle, from when it is planted as a seed to when it is harvested. This allows for a more efficient use of square footage, labor, plant health inputs, energy usage, and equipment. Technology and automation may be implemented to further improve efficiency. A combination of natural and artificial light can be used in the facilities to optimally grow the plants. The improved efficiency and optimization may be used to determine target weight and height, to reach the target in the fewest days possible, and to maximize a success rate of survivability and achieving the target. The optimization may occur in each phase, including the nursery phases and greenhouse phase. An artificial intelligence or AI program may be implemented to control and identify how to optimize crop growth.

FIG. 1 may illustrate an exemplary plant growing process. In an exemplary embodiment, the plant growing process may be split into multiple phases. Each phase may occur in a different location. For example, a first phase may be the germination phase 102. The next phase 104 may be a nursery phase. Then, the plants may be moved or transplanted 106 to subsequent one or more nurseries 108. The transplant 106 may be implemented using robotics. In an alternative exemplary embodiment, the plants may be kept in a first nursery, which may then be transformed in order to change the nursery conditions, thus minimizing movement of plants. The orientation and environment of the first nursery could be altered, including spacing, which may reduce or eliminate the need for transplanting.

The various phases of the cycle may be customized for different varietals and may be adjusted over time. The phases may be customized for optimal time on a final hydroponic system or phase, which may be a natural or artificial system and may include a greenhouse, a deep-water agriculture location, a body of water or any combination thereof. The number of phases, including nursery phases and the specific indexing may all be adjusted as necessary to optimize the process. Different varietals may use any number of nurseries and associated nursery phases. Plants may be supported throughout the phases on platforms that may have at least one plant site. The platforms may be trays or hydroponic plant vessels, which may removably secure to a hydroponic system structure, rest on a hydroponic system structure, float on a hydroponic system, or otherwise support a plant to facilitate hydroponic growing as would be understood by a person having ordinary skill in the art.

A first exemplary phase may be the germination phase 102. In this phase, the crop is initially planted and sprouts from the seed. Germination may take place in a dedicated location or machine. For example, a specific germination chamber may be used in order to house some number of plants or a dedicated germination room used in order to house some number of plants may be implemented; in various exemplary embodiments, such chamber and/or room may be configured to modulate its internal environment based on one or more environmental factors including, for example, the air temperature, relative humidity, light, light intensity, $CO_2$ content, air velocity, and/or air circulation needs of the plants during a given phase. By individually modulating environmental factors in each germination location or machine, the speed of germination may be increased. In an exemplary embodiment, germination may only consist of 0-30 days. Multiple cycles of germination may populate the nursery phase or phases.

Another exemplary phase may be a nursery phase 104. In this phase 104, the plants may begin growing. Formulas may be implemented in order to optimize environmental factors to more efficiently grow the plants. For example, a formula may optimize plant density per square foot, nutrient type and volume, and reduce photon waste from seed to harvest. The minimum footprint and energy usage may be obtained while maximizing yield. The plants may be indexed so as to ensure maximum light absorption while minimizing light wasted on non-foliage space, or white space. The use of such formulas may provide an increase in production by three times in an exemplary embodiment. In the nursery phase plants may be disposed on a nursery tray with optimal plant spacing and density.

In an exemplary nursery phase 104, the plants may begin their lifecycle. They may continue in the nursery until they reach a desired size. It may be contemplated that the desired size may be chosen based on the space available, such that plants grow in a nursery until further growth is inhibited by plant density.

At a desired point in the lifecycle, the plants may be transferred to one or more subsequent nurseries for subsequent nursery phases 108 or may be transferred to a greenhouse. In an exemplary subsequent nursery phase, the plants may be larger. Environmental conditions may be changed as plants grow or when plants are moved to subsequent phases or nurseries. For example, an increased photo-period may be implemented, where a higher intensity light is used for a longer period of time. Air flow may be increased to accommodate elevated levels of transportation. Increased levels of nutrients may be implemented to accommodate the increased age of the plant. In an exemplary embodiment, plants may be spread further apart in order to accommodate their increased size.

As plants grow or during a transplant 106 to a subsequent phase or nursery, the number of plants transferred may optionally be reduced. The reduction may be plant specific for optimization. As a result, the plants may be less densely configured so as to allow them room to grow. The step of reducing plant numbers may allow plants to be grown densely early in the lifecycle and spread out later in subsequent phases or nurseries, thus allowing for a larger amount of plants to be grown. According to an exemplary embodiment, all plants being indexed may be moved from a germination phase to a nursery, a nursery to a subsequent nursery, a nursery to a greenhouse, or a subsequent nursery to a greenhouse and the transplanting machine may take a seedling tray with 1 to 10,000 cells, an initial density, and automatically transfer some or all of the plants to one or more new trays with adjusted spacing for optimized density at the next phase. According to some exemplary embodiments, time in various phases may be an input in an optimization formula. For example, the time and indexing in the nursery phases may optionally be adjusted to achieve a desired time in a greenhouse phase. An exemplary greenhouse phase may have a desired length in days, which may be used to optimize the nursery phases. According to some exemplary embodiments, a desired number of days may be 0 to 365. In the nursery phases, indexing, time, and environmental conditions may be optimized to minimize the length of time in the greenhouse. As would be understood by a person having ordinary skill in the art, this may be an exemplary embodiment and may be unique for each varietal.

Each plant may be individually indexed and may have its own indexing formula in each nursery. The index of plants may include information relating to various optimal parameters, such as plant density in trays, individual plant size/mass, plant root size/mass, nutrient or water intake, light intake, a time spent in any of the phases, and the like. For example, plant A may germinate and grow quickly as compared to other plants. Plant A may allow for a higher density but fewer days in a nursery. The density may be decreased in a subsequent nursery and may be further decreased in the greenhouse. The days in the subsequent nursery and/or the greenhouse may also be lower. On the other hand, plant B may require less density in each phase and more days in the nurseries and greenhouse. Each plant varietal may have an individualized formula to optimize efficiency.

In certain embodiments, some or all of the plants from a nursery may be transplanted 106 to one or more subsequent nurseries. In alternative embodiments, the size of the nurseries may vary to accommodate the change in density and duration. According to an exemplary embodiment, the plants may be disposed on a nursery specific tray, which may optimize the spacing for the phase and/or specific nursery conditions, as would be understood by a person having ordinary skill in the art. The tray may be specific to a particular plant species. Nurseries may refer to different physical locations of the plant cycle; however, it may be understood that a nursery may include one or more physical nursery spaces. Nurseries may be different physical sizes or a different number of physical nurseries to accommodate optimal plant density and duration. The duration may be the residence time, or amount of time a plant may spend in each of the nurseries. Furthermore, the trays of a subsequent nursery may be different from an initial nursery to achieve the desired optimization.

Referring back to FIG. 1, the plants may be transplanted 106 from a nursery to one or more subsequent nurseries for a second nursery phase 108. As previously discussed, after requisite time the nursery, the plants may be transferred to the one or more subsequent nurseries. It may be contemplated that different varietals of plants in a nursery may remain in the nursery for different periods of time. In an exemplary embodiment, plants may remain in the same substrate for the entirety of their life. The seeds may be initially planted into soil or a substrate. After a nursery phase, plants may be mechanically transplanted from their cell trays into lower density trays, depending on the type or varietal. The transplanter may grip the substrate using robotic members in order to move. In an alternative embodiment, the plants may be each individually placed in pods which may be gripped and moved by the transplanter. Upon completion of subsequent nursery phases, plants may be mechanically transplanted from the tray configuration to a hydroponic plant vessel, in an exemplary embodiment. The hydroponic plant vessel may be a part of a greenhouse hydroponic system. Hydroponic plant vessels may have a desired number of cells for optimal plant density and may be specific to varietals.

The plants may then continue growing in the one or more subsequent nurseries, which may optionally be less dense and may allow the plants additional space for further growth.

In an exemplary embodiment, another transplant 110 may occur to move the plants from a nursery or subsequent nursery to the greenhouse phase 112. The transplant 110 may also be implemented via robotics. In an exemplary greenhouse phase, plants may no longer be vertically arranged and instead may be laid out or arranged in order to capture natural sunlight. The natural sunlight may increase the speed at which the plants reach their final form, and supplemental lighting might not be needed or may be reduced. Further, while an exemplary nursery may implement an ebb flow or flood drain hydroponic system, an exemplary greenhouse may implement a deep-water culture hydroponic system. In an exemplary embodiment, passive cooling (potentially evaporative in nature) may be implemented in the greenhouse, as opposed to the mechanical cooling & heating systems used in nurseries. It may be contemplated that mechanical cooling & heating or other systems are used throughout, depending on the climate and the application. Other systems may be contemplated. For example, a passive cooling system may be used. Nutritional and environmental conditions may also be altered in the greenhouse or nursery. Nutrients may be added throughout the phases. In an exemplary embodiment, the supply of nutrients may be controlled by an automated control system. Plants may then be harvested from the greenhouse.

Figure 2:
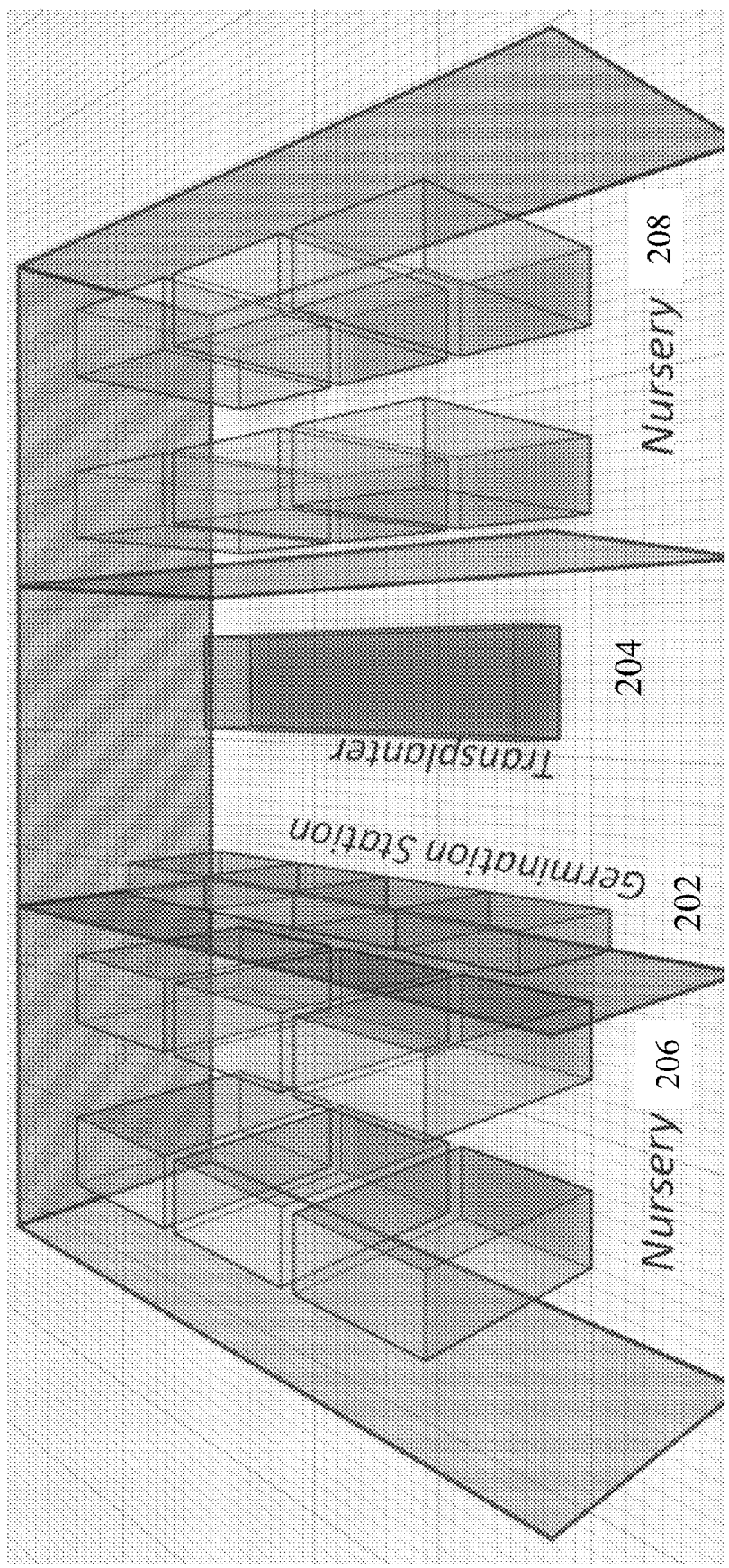
FIG. 2 is an exemplary embodiment of a Nursery.

Referring now to the exemplary embodiment in FIG. 2, FIG. 2 may show an exemplary nursery facility. Nurseries 206, 208 may be separated by a germination station 202 and a transplanter 204. An exemplary germination station 202 may be a vertically setup station. The germinated plants may then be moved into a nursery 206.

Next, the transplanter 204 may be utilized to transplant the plants from a nursery 206 to one or more subsequent phases or nurseries 208. After the appropriate period of time, the same transplanter 204 may be programmed to transplant the plants into the greenhouse hydroponic plant vessels. The germination phase may implement specialized equipment or spaces to increase environmental parameters such as temperature and humidity of the ambient space, such that the controlled environment created accelerates the germination of the sowed seeds. In an exemplary embodiment, the transplanter may be an automated and mechanized piece of equipment designed to index seedlings with different densities. The transplanter may be capable of indexing seedlings from tray to tray with differing densities and also from tray to hydroponic plant vessel with differing densities. The density may vary by varietal.

Figure 3:
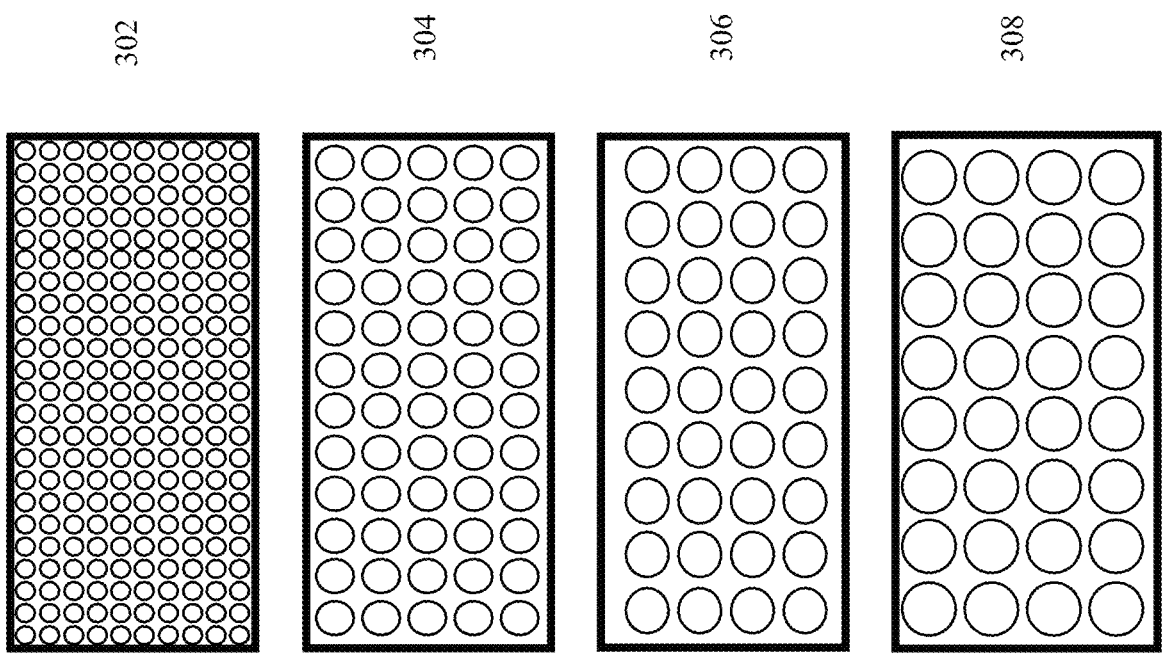
FIG. 3 is an exemplary flowchart depicting plant indexing of a farming process.

Referring now to FIG. 3, FIG. 3 may show an exemplary embodiment of plants at different lifecycles in each phase. As shown in FIG. 3, a nursery 302 may be densely packed at the earliest stage of the planting. Next, a subsequent nursery 304 may be shown where the plants are larger and more spread out to account for their increased sized. An exemplary multi-nursery design may optimize plant growth and increase yield. According to some exemplary embodiments, annual facility yield or yield per square foot may be increased. The next stage may be the final hydroponic system or greenhouse phase 306/308, where the plants are kept in a greenhouse and are no longer vertically oriented. Instead, in an exemplary embodiment, plants may be placed on a hydroponic plant vessel. The hydroponic plant vessels may be movable throughout the final hydroponic system.

The final greenhouse system phase (which may potentially be hydroponic), may be the final phase where the plants are placed in order to quickly reach their final size of the farming cycle. The use of a final greenhouse system and natural sunlight may allow the plants to grow at a larger rate. Plant growth may be exponentially faster when transplanted to a final greenhouse system. An AI system may calculate the ideal time to move plants into the greenhouse phase, and when to harvest from the greenhouse phase. The ideal time to move plants from the nursery phase to the greenhouse phase may be calculated to optimize or decrease the total amount of time required for the plants grow to maturity and the available natural and artificial light avail in the stage. It may be contemplated that environmental and other factors are also optimized by the AI in the greenhouse phase.

The time at which the plants are placed in a nursery or subsequent nursery is optimized in order to shorten the total length of time needed to grow the plants. The final greenhouse system may facilitate growth during the final stage of the plant's hydroponic farming cycle. The final hydroponic system may be implemented in a greenhouse. Plants may only spend a short time on the final hydroponic system, thus allowing for quick product flexibility. Purely vertical farms might not benefit from the same exponential growth caused by implementing greenhouses (which may use hydroponic systems). The use of natural sunlight may expedite the growth of the plants in the final stage, and thus the AI control unit can optimize the growth of plants by placing a large number of plants in a stacked/vertical nursery phase, and then moving a smaller number of plants to quickly finish growth in a horizontal greenhouse phase in which the plants receive natural sunlight.

The greenhouse may be a hydroponic system, and may have associated hydroponic plant vessels. An exemplary hydroponic plant vessel may include multiple plant sites. Each exemplary hydroponic plant vessel may only include one varietal of crop. Each hydroponic plant vessel may be individually controlled, monitored, and harvested. A single hydroponic plant vessel may allow for large product flexibility and no operational inefficiencies between crop types. A hydroponic plant vessel may have any number of plant sites. An exemplary hydroponic plant vessel may include 1-1,000 discrete plant sites. In an exemplary embodiment, each hydroponic plant vessel may only include one type of plant. An AI may be implemented to track a large number of hydroponic plant vessels. The AI system may customize plant parameters within each vessel according to the plant type.

The optimization techniques provided, if desired, may be governed according to one or more predetermined rules in order to optimize the photon-per-square-foot efficiency for a particular plant or series of plants. Such rules may vary based on the plants or combinations of plants at each stage; different types of plants may benefit from different amounts of light generally, or may benefit from different amounts of light at different stages in their growth cycle; additionally, certain types of light may be more effective at different stages of the growth cycle for certain plants, which may also adjust how these rules may be applied. Likewise, such rules may additionally vary based on light conditions, which may vary based on season, altitude, transmissivity of the greenhouse glass, availability of artificial light, and so forth. In order to determine an appropriate set of rules governing a particular set of plants, plant specifications and particular set of conditions, it may be contemplated to measure whitespace and greenspace daily for a set of plants from seed to harvest, with the density of the planting and the time that the plants spend in each phase then being optimized as a result of the measured whitespace and greenspace. It may be contemplated that the optimization techniques may be implemented by an autonomous control unit or AI system. The AI may implement the predetermined rules to optimize efficiency. Sensors can feed the AI data regarding the conditions, whitespace, and greenspace for the set of plants. The AI can then process that data along with the rules and/or historical plant data to optimize the plant conditions and plant density.

In an exemplary embodiment, for the sake of illustrating an exemplary cycle, each nursery may have a given size and the greenhouse may have a certain size. It is of course contemplated that a variety of nursery and greenhouse sizes may be compatible with this technique, and that convenient demonstrative numbers have simply been chosen here. According to some exemplary embodiments an exemplary nursery may have a size of 100 to 100,000 square feet and a greenhouse may have a size of 100 to 500,000 square feet. In this example, there may be a total of 10,000 plants in a nursery, meaning that the total plants per square foot may be determined based on the total number of plants divided by the total amount of nursery square footage, yielding a density of plants per square foot in the nursery. According to some exemplary embodiments, an exemplary nursery may have 100 to 1,000,000 plants. A yield of plant sites per square foot per day may be calculated by dividing the number of plants per square foot by the number of days in a nursery. A subsequent nursery may have less plants in a similar amount of square footage, which may result in lower plant density and fewer plants per square foot. However, importantly, the plants may spend less time in the subsequent nursery resulting in a similar yield of plant sites per square foot per day. An AI system may autonomously identify an ideal density for each of the nursery phases and greenhouse phase which optimizes plant growth. The identified ideal density may be based on historical plant data as well as other factors or equations used to optimize the speed and volume of plant growth. The AI system may also instruct another system or a robotic system to move or transplant the plants from the nursery phase to subsequent nursery or greenhouse phases.

The greenhouse density may then be calculated based on the total number of plants in the greenhouse, divided by the total greenhouse space, yielding a total of plants per square foot in the greenhouse. According to some exemplary embodiments, the number of plants in the greenhouse may be between 0 and the number of plant sites in the nursery phases. According to some exemplary embodiments, a greenhouse may have 100 to 1,000,000 plants. Greenhouse efficiency may be represented by plant sites per square foot per day. The daily yield of plants per day may be determined by the square footage of the greenhouse multiplied by the number of plant sites per square foot per day. This data may then be optimized to solve for the largest or optimal number of plants per day. An AI system or control unit may identify the relevant variables which affect the optimal number of plants possible, may adjust plant parameters or conditions to optimize the life or growth of the plants, and may arrange or configure the plant arrangement in order to ensure that the optimal number of plants are transplanted in a given phase at any given time. Plant growth could be stunted when plants are too densely arranged. Further, a thinly populated arrangement is inefficient since extra white space may be utilized to grow additional plants. The AI system may optimize the plant growth rate to maximize efficient use of the white space. The exact number of plants at each phase may be impacted by survival of the plants during the lifecycle, as would be understood by a person having ordinary skill in the art.

Such optimization may take into account diminishing returns which may result from particular adjustments. A maximum threshold of efficiency may be reached when it is determined that an increase would require a reduction in plants per square foot or an increase in photons. Traditional systems may put young plants onto the final hydroponic system and thus have a large amount of white space, or unused areas, in the greenhouse. However, exemplary techniques such as those discussed herein may minimize white space at every phase of the plant life cycle and may normalize the amount of time on the final hydroponic system. Optimization at the final hydroponic system may allow for a higher annual production and greenhouse turn capability. The amount of time in each phase and on the final hydroponic system may, as noted, be optimized based on the individual species; overcrowded nurseries may provide less space for plants to grow, and therefore additional plants may not provide a full return, but the threshold of when a nursery or greenhouse is "overcrowded" may be determined specifically for a given species or set of species. Thus, when an unsatisfactory level of diminishing returns is experienced, it may be contemplated that the plants may then be placed in the next nursery or phase.

From the germination phase through the nursery phases, the plants may be monitored in order to ensure an optimal environment for their growth. Further, the monitoring of the plants may allow them to be moved between phases at an optimal or more efficient time. For example, once the plants reach a target weight and/or size, it may be favorable for them to move to a next phase. It may be contemplated that an AI system could be implemented in order to monitor the plants and to regulate their environment. The AI may be cloud based or may incorporate cloud-based data. The AI may be a machine learning algorithm, or the like. The AI may control the supple of nutrients throughout the plant life cycle.

Image recognition and sensor programmable logic controllers may be implemented to drive optimization of critical environmental data. Some examples of environmental data to be optimized may be air temperature, relative humidity, light, light intensity, $CO_2$ content, air velocity, and air circulation. The controllers may also control and/or measure the water temperature, electrical conductivity, pH level, dissolved oxygen level, moisture content, nutrients, and water of the plants. The environmental data may be optimized specific to each plant growing.

Figure 4:
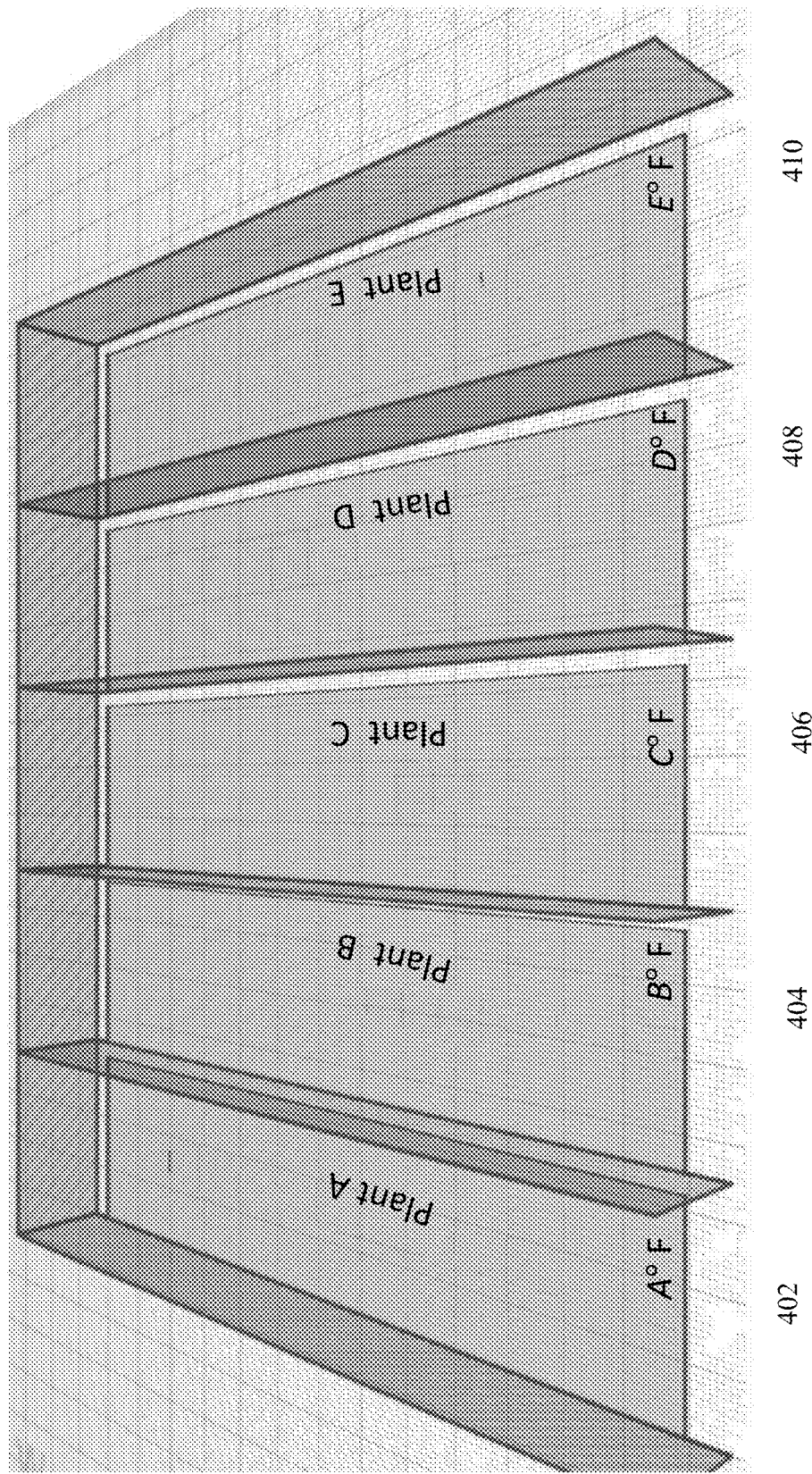
FIG. 4 is an exemplary embodiment of a farming facility split to farm different plants.

Referring now to FIG. 4, FIG. 4 may illustrate an exemplary division of plant products. The example in FIG. 4 shows 5 different plants in a facility which are separated from one another. In this exemplary embodiment, Plant C 406 is kept at a different temperature from the neighboring Plant D 408. Similarly, the remaining plants 402, 404, and 410 are also kept at different temperatures. Although not explicitly illustrated, it may be contemplated that any environmental parameter, such as those described above, may be altered individually in each section. For example, it may desirable for Plant C 406 to be grown at a higher humidity than Plant E 410. Each of the greenhouse zones may be monitored by their own individual sensors. Environmental parameters may be autonomously controlled by their own individual controllers which may drive various systems. In an exemplary embodiment, the AI may monitor the greenhouse zone and autonomously control the environmental parameters. In one embodiment, the controllers may be, for example, programmable logic controllers. Environmental parameters may differ between plants. For example, still referring to the exemplary embodiment in FIG. 4, Plant A 402 may be of a different species than Plant B 404, and therefore may require different environmental parameters, such as a different temperature and/or different nutrients. An exemplary AI system may identify the type of plant and then customize or adjust the parameters based on the plant type, as well as other information such as historical plant data.

For example, the AI may adjust a control unit set to control a heating or cooling unit, humidifier or dehumidifier, air purifier, water sprayer, nutrient sprayer, or any other contemplated mechanism which changes some environmental parameter. In an embodiment, the same control unit and AI may also implement image recognition, volumetric sensing, air and surface temperature detection, moisture content detection, or other sensors to determine when each plant is ready for transplant. Environmental sensors may measure temperature, humidity, C02 concentration, light intensity or photosynthetic photon flux density (PPFD). Other exemplary sensors may be hydroponic sensors (which measure electrical conductivity), pH sensors, or dissolved oxygen sensors. The combination of these exemplary elements may allow for the AI to predict an optimal time for transplant.

In a further exemplary embodiment, AI may be implemented in the greenhouse phase. For example, LIDAR may be implemented to estimate the size and weight of the plants, and thermal imaging may provide data on the moisture content. These sensors or cameras may feed data to the control unit which could then optimize the environmental parameters.

Thermal imaging may provide moisture content readings to the control unit. This may be used, for example, to drive an overhead irrigation boom if moisture content readings are low. LIDAR may predict the growth rate, harvest time, and volume. Exemplary data may forecast accurate business or sales yield projections. LIDAR data on predictive growth rate and volume may also drive environmental parameters in the greenhouse.

Each plant, seed, tray or hydroponic plant vessel lot may have a graphical representation pulled from control system data which represents environmental data for each day of a seed's life from germination to harvest. Historical seed biometrics may be provided to the AI algorithm in order to better predict and optimize the process.

In an exemplary embodiment, robotics may be implemented. The transplants or the transplanter described above may include a robotic unit which extracts the plants and then places or plants them in another location or unit. Further, the plants may be planted on a shelf or other unit which is capable of movement and can be controlled by a control unit. The AI may control robotics to transplant or move the plants within each phase or between other phases. For example, an AI may move the plants from a first nursery phase to a subsequent nursery phase when the plant configuration reaches a predetermined density. Alternatively, the AI may control a robotic or mechanical tray which expands in order to decrease plant density. In another exemplary embodiment, the AI may control a germination robot configured to plant seeds and seedlings in the germination phase. In some further exemplary embodiments, the plants may be transplanted to trays having varying densities of plant sites. For example, plants may be transplanted to trays having a less dense arrangement of plant sites as the plant size increases.

The AI may implement computer vision and/or other sensors to analyze plants in the various phases. In or after the greenhouse phase, the AI may control or operate a robotic system for harvesting the plants from the greenhouse(s) they are disposed in in the greenhouse phase. Thus, it may be contemplated that an exemplary embodiment is fully autonomous. In a fully autonomous exemplary embodiment, seedlings may be planted in a germination phase by a robot, and then may be moved to each of the subsequent phases using additional robotics which are autonomously controlled by the AI. A further embodiment may harvest and prepare the plants for shipping using the robotics and AI. It may be contemplated that the AI is configured to receive instructions from an external machine, such as a web server, and to then operate the robotics to plant the seeds or seedlings based on the received instructions. The instructions may include a plant type and quantity, a desired size, a desired age, and a shipping address, for example. The AI system may then plant and grow one or more plants according to the instructions. In an exemplary embodiment, the AI may control all the systems, from the germination phase to harvest, based on the received instructions, without human intervention. The AI may identify optimal times for transporting or transplanting the plants to the different phases based on sensor data, historical data, or any other contemplated information. In a final step, the AI system may harvest the plants from the final greenhouse phase, and may place the harvested plants into a shipping package. The shipping package may include shipping information related to the user who placed the order on the web server corresponding to the instructions. Thus, an exemplary embodiment may be fully implemented by an autonomous AI system which can control one or more robots to move and/or harvest the plants and one or more control systems to optimize the plant conditions/parameters.

In an exemplary embodiment, the greenhouse may implement robotics in order to harvest. A robotic arm may move hydroponic plant vessels via transport channels in the final hydroponic system seeding phase and the final hydroponic system harvest phase. The robotic arm may be integrated or controlled by the control unit. The control unit may detect that a plant is ready for harvest based on size data collected from the LIDAR and may then direct a robotic arm to harvest said plant. In a further embodiment, the control unit may be integrated with a sales or harvest schedule in order to pull hydroponic plant vessels from the final hydroponic system and package the product accordingly. For example, the robotic arm may harvest and package a specified number of plants together based on a scheduled sale.

In another exemplary embodiment, a robotic arm may harvest individual plants. The individual plants may be packaged for individual sale. For example, robotic fingers may harvest a plant into a cup or other package, where the plant may be sold as a potted plant.

Figure 5B:
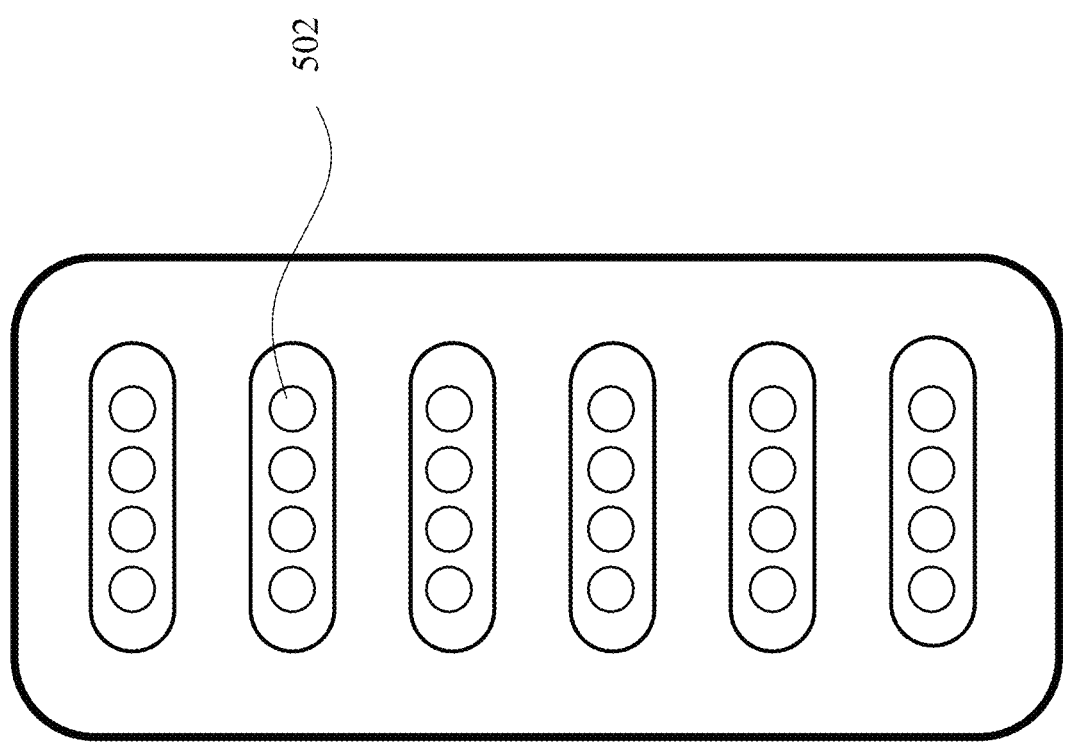
FIG. 5B is another exemplary embodiment of a greenhouse hydroponic plant vessel.
Figure 6:
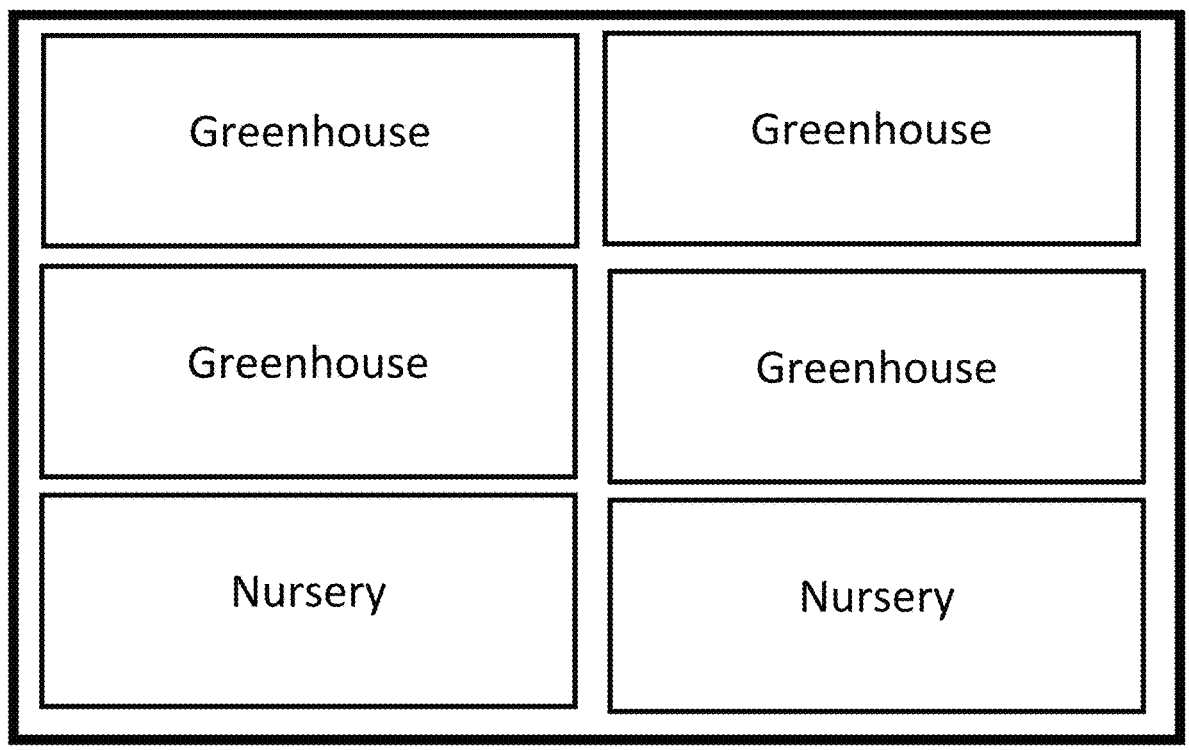
FIG. 6 is an exemplary layout of a farming facility.

Referring now to the exemplary embodiment in FIGS. 5A-5B, FIG. 5A may show an exemplary embodiment of a greenhouse hydroponic plant vessel 500. Plants may be placed in the hydroponic plant vessel at plant sites 502. The size of the raft may vary depending on the application. It may be contemplated that a hydroponic plant vessel is more or less dense. Referring now to the exemplary embodiment in FIG. 6, FIG. 6 may show an exemplary layout of a farming facility. As shown in FIG. 6, multiple greenhouses (or nurseries) may be partitioned in one large facility. Such partitioning allows for multiple different crops to grow in individualized environments. Further, the partitioning prevents the spread of pests, virus or disease throughout the entire facility. Instead, a breakout in one section may be contained. Additionally, the partitioned design may allow for a modular expansion of the facility. Additional sections can be easily integrated and expanded. The segmented nature of the facilities may allow maximum flexibility to switch between various crops. The greenhouse and nursery combination may allow for the facility to achieve an optimal combination of natural and artificial light. An AI system may identify a type of each crop and then may individually optimize the crops based on the type. The partitioning allows the AI system to optimize individual crops which may be planted next to or near plants of other types.

Each greenhouse environment shown in FIG. 6 may be individually controlled and automated. Automated seeding lines and high-efficiency germination chambers may be implemented along with nurseries. The center transport channel may efficiently move product from greenhouses into harvesting and packaging. It may be contemplated that an automated system uses the transport channels as harvesting and production lines. An exemplary AI system may utilize the transport channels within the facility for moving plants between phases. Portions of the facility may be kept cooler for packaged goods. It may be further contemplated that a dedicated nursery building may be expanded into the warehouse.

Figure 7:
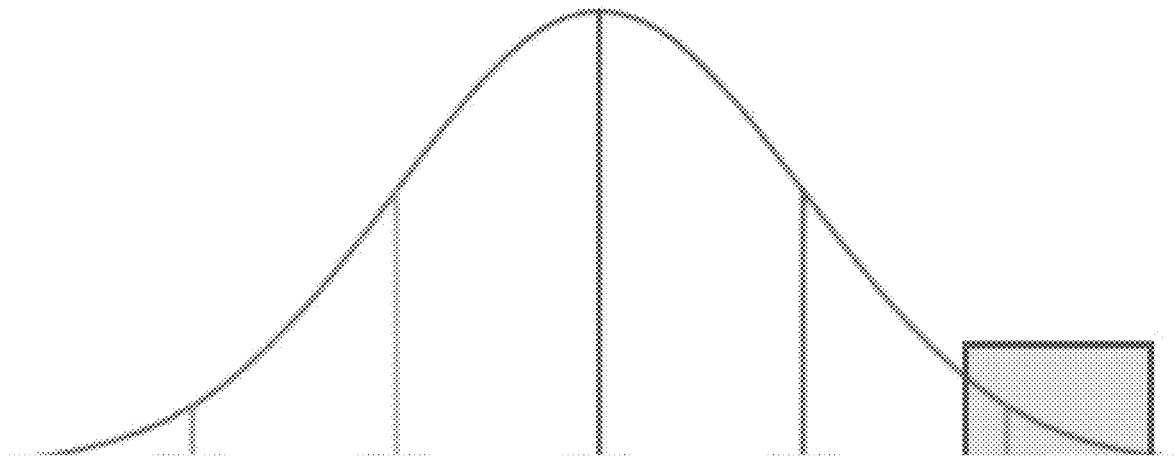
FIG. 7 is an exemplary data model leading to an exemplary environmental condition AI, algorithm, and machine learning.

FIG. 7 may be an exemplary data model of a plant. An AI or machine learning system may simulate trials to identify and model the lifecycle of a plant. Data may include, for example, plant specific data, such as total mass, leaf size, color, health, pest infestation, or root size. History tracked by duration in each cycle or phase may be tracked and compared to expected values. Data may also include growing history data, such as total right received (DLI), nutrients consumed, or CO2 consumed, for example. This may also implement tracking data within the greenhouses. The data models of each plant may be formed or identified by, for example, monitoring each plant throughout the lifecycle of the plant. An index of each plant may thus be formed by modeling multiple plants as they grow. The indexing of plants may allow for the identification of optimal parameters for plant growth.

Figure 8:
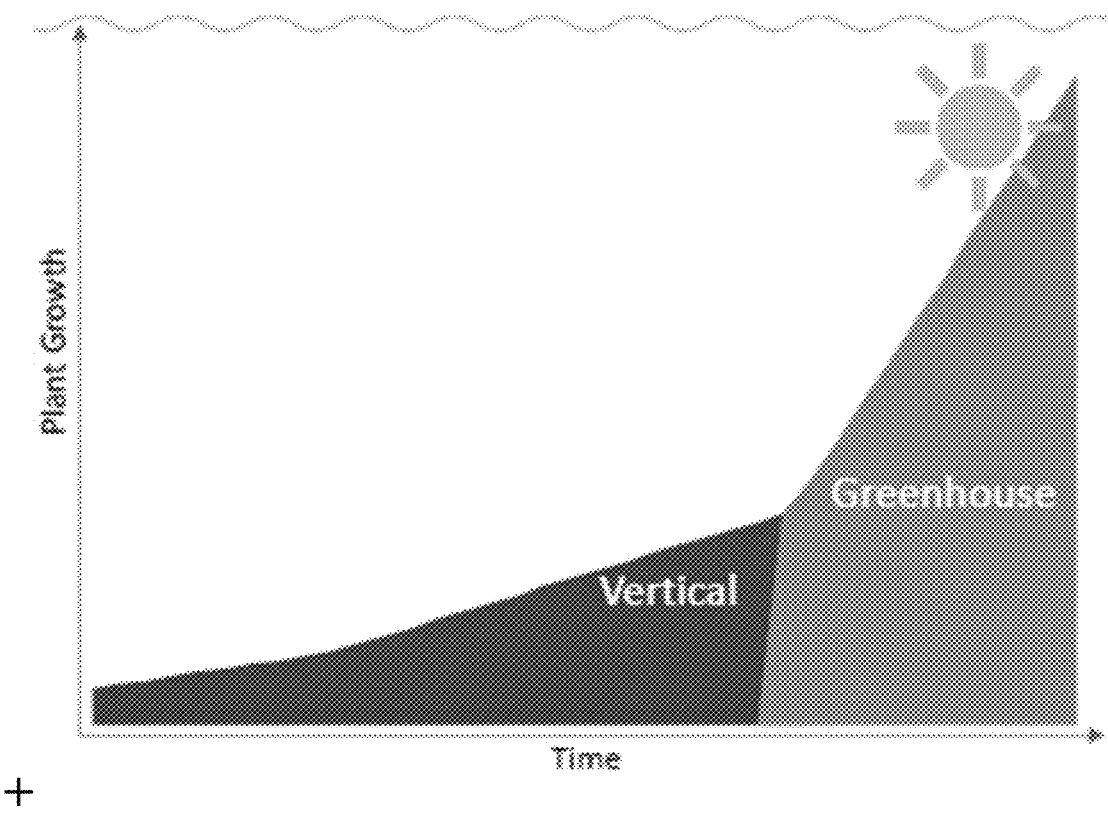
FIG. 8 is an exemplary graphical chart illustrating plant growth over time and place in an exemplary embodiment.

Referring now to the exemplary graph in FIG. 8, FIG. 8 may show plant growth over time in an exemplary embodiment. In the first vertical section, the plants may be in the germination and nursery phases, where the plants may be kept in vertical arrangements. Then, the plants may be brought to the greenhouse or final hydroponic stage which may allow growth at a higher rate. The greenhouse stage may or may not employ vertical arrangements and may optionally receive natural light in addition to or instead of artificial light. As shown in FIG. 8, the initial rate of plant growth in the vertical phase may be slower than the rate of growth in the greenhouse phase. Thus, efficiency may be increased by placing a large number of plants in the nursery phases and transplanting some of them into a less dense and quicker greenhouse phase for the final period of growth.

According to an exemplary embodiment, a transplanter may be used to transfer plants from an initial platform or substrate to a tray. The tray may be optimized for a specific plant varietal. Adjustments may include plant spacing. The transplanter may be controlled by a human operator or by an AI control unit. The AI may identify optimal times for transferring plants, and may activate the transplanter at those times.

According to an exemplary embodiment, a greenhouse may be laid out traditionally (as opposed to vertically) in order to allow for natural sunlight to shine on the plants (and may potentially be augmented by artificial light), thus promoting faster growth. In some embodiments, different varieties of plants may be planted in the same greenhouse. When transplanted to the greenhouse, it may be contemplated that the plants are spread out in anticipation of them reaching a desired size. An AI may optimize the density of plants in the greenhouse.

Figure 9A:
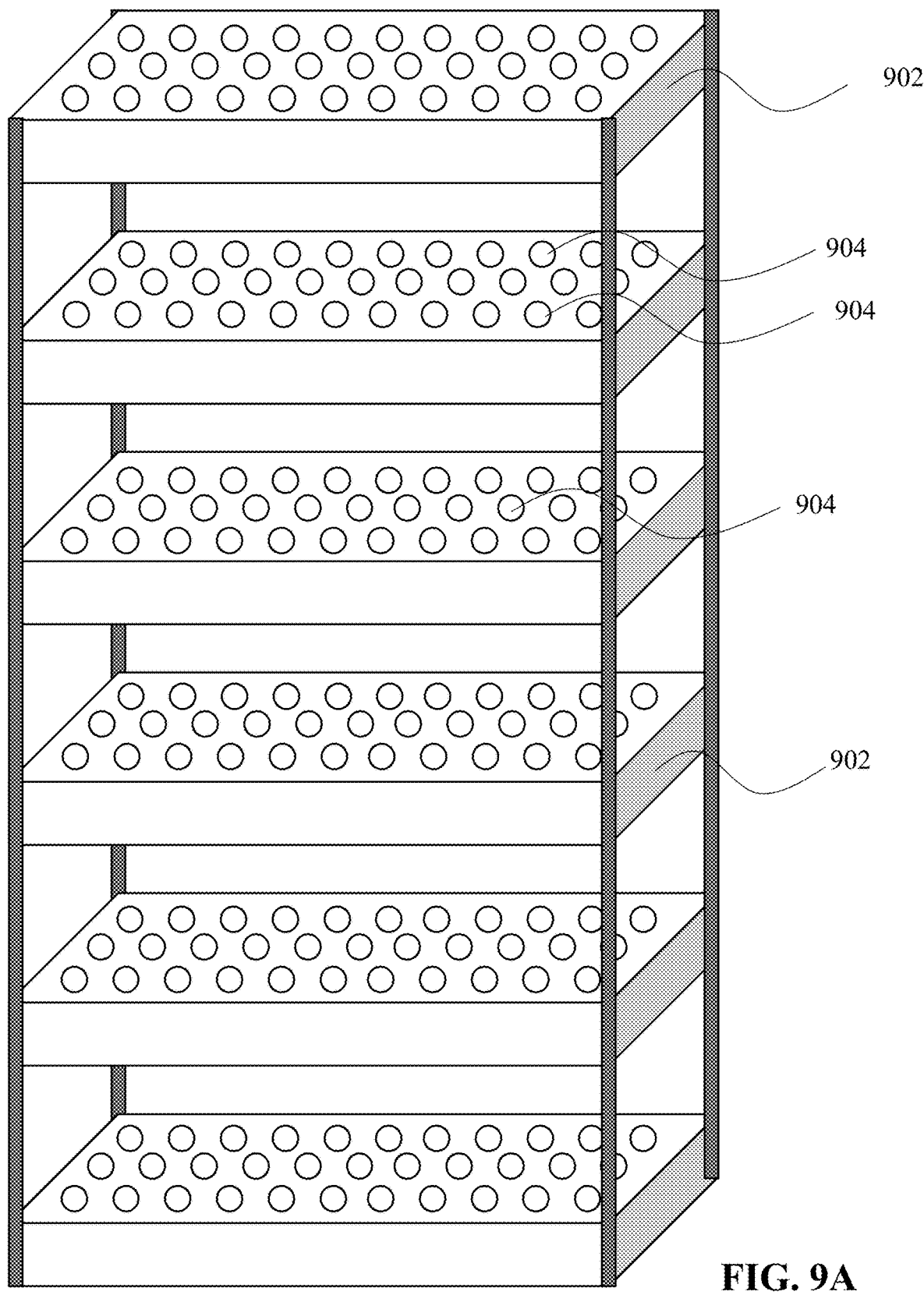
FIG. 9A is an exemplary embodiment of a vertical farming arrangement.
Figure 9B:
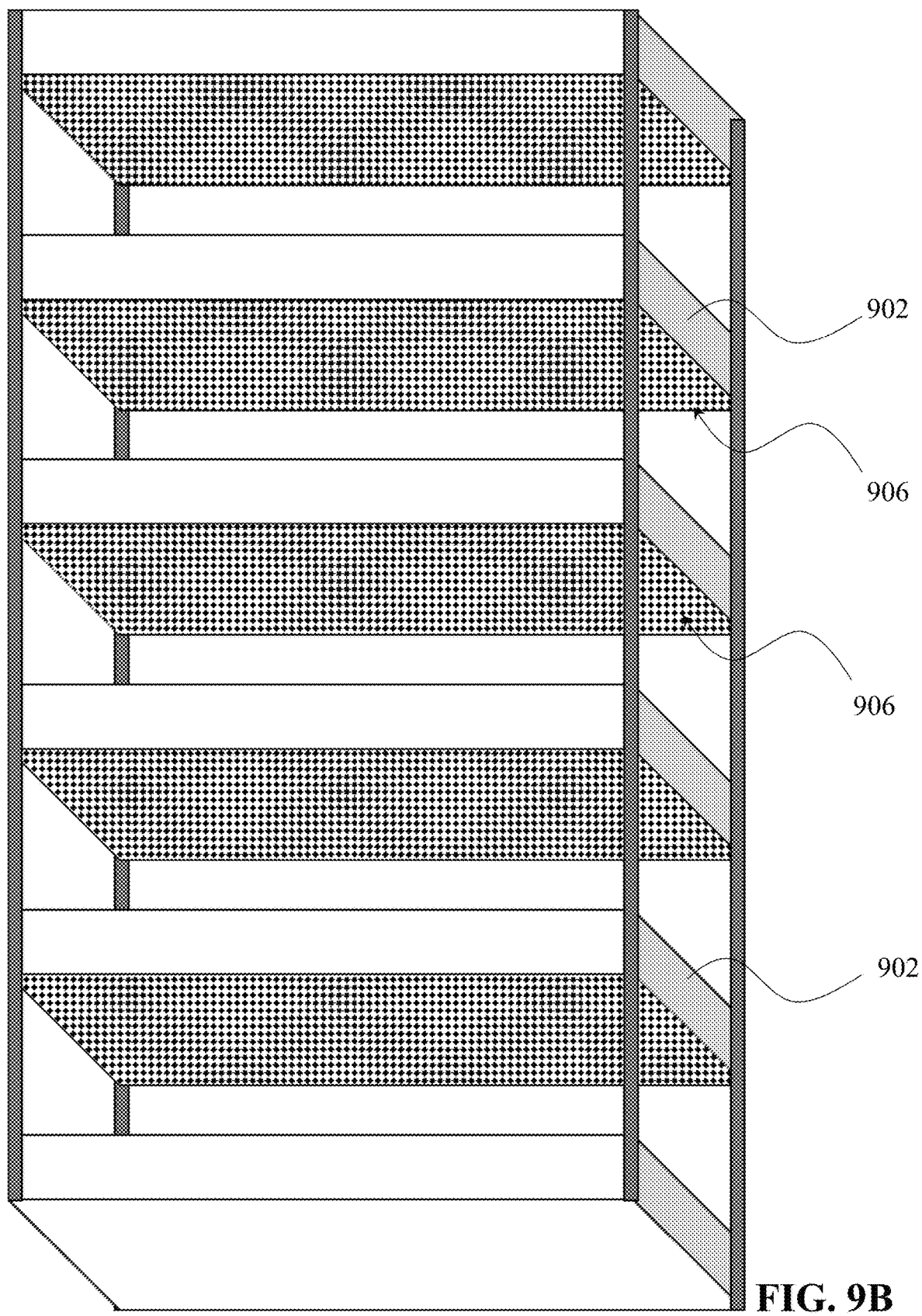
FIG. 9B is an exemplary embodiment of a vertical farming arrangement.

Now referring to exemplary FIG. 9A-9B, an exemplary vertical arrangement for a nursery phase may be shown. A vertical hydroponic arrangement 900 may have a series of shelves 902, which may support plants 904. Shelves 902 may also have light sources 906 disposed on an under-side to irradiate plants below. The light sources may be light emitting diodes (LED). The shelves may further incorporate systems for transporting nutrients and water into each of the shelves 902. Further, an exemplary embodiment may include a grip or handle which is used by a transplanter or other robotic element for moving the shelves or for moving plants within the shelves.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for farming plants, comprising:
    planting a plurality of seeds or seedlings on one or more plant trays having individual plant sites;
    beginning a germination phase;
    after the germination phase, identifying a plurality of plants germinated from the plurality of seeds or seedlings:
    transporting the plurality of plants to a nursery in one or more nursery phases;
    transplanting the plurality of plants to a greenhouse after the one or more nursery phases, beginning at least one greenhouse phase;
    harvesting the plurality of plants from the greenhouse;
    monitoring, by at least one sensor or monitoring device, a plurality of plant parameters;
    adjusting, by a control unit, a plurality of environmental parameters, wherein machine learning is used to optimize and control the plurality of environmental parameters;
    identifying an optimized plant density based on an identified growth of the plurality of plants from the plurality of plant parameters identified in the one or more nursery phases; and arranging the plurality of plants according to the optimized plant density in the greenhouse to minimize an area between the plurality of plants, wherein the control unit is configured to:
adjust a plurality of growth parameters for each plant of the plurality of plants, and
adjust the environmental parameters differently according to the growth parameters and/or a plurality of requirements of each of the germination phase, the one or more nursery phases, and the at least one greenhouse phase depending on the identified growth for each plant of the plurality of plants.

2. The method for farming plants of claim 1, wherein the environmental parameters comprise at least one of plant density, plant air temperature, relative humidity, light intensity, CO2 content, air velocity, air circulation, water temperature, electrical conductivity, pH level, dissolved oxygen level, nutrients, water level of the plurality of plants, a duration of time spent in each of the one or more nursery phases, a duration of time spent in the at least one greenhouse phase, and a duration of time spent in the germination phase.

3. The method for farming plants of claim 1, wherein the control unit is connected to the at least one sensor or monitoring device and the method further comprises:
measuring a plurality of environmental parameters, including one or more of: water temperature, electrical conductivity, pH, dissolved oxygen, air temperature, relative humidity, CO2 content, light intensity, and air velocity.

4. The method for farming plants of claim 3, wherein the at least one sensor or monitoring device further comprises one or more of a camera, a light detection and ranging (LIDAR) system, a thermal imaging sensor, a thermometer, a biosensor, a biochemical sensor, and a metal-oxide semiconductor (MOS) sensor.

5. The method for farming plants of claim 1, wherein the control unit is connected to an external system for providing a plurality of environmental parameters, and the control unit adjusts the plurality of plant parameters based on the plurality of environmental parameters.

6. The method for farming plants of claim 1, further comprising:
receiving, by the control unit, historical plant information relating to one or more of the plurality of plants: and
adjusting, by the control unit, the plurality of plant parameters based on the historical plant information.

7. The method for farming plants of claim 6, further comprising:
storing plant growth information relating to each farmed plant to the historical plant information after harvesting the plants.

8. The method for farming plants of claim 1, wherein the control unit implements the machine learning based on an algorithmic driven regression formula to optimize plant growth.

9. The method of farming plants of claim 1, further comprising:
harvesting a whole crop into a cup, such that the whole crop is living in a medium within the dirt cup.

10. The method of farming plants of claim 1, further comprising:
sending, by the control unit, instructions to a robotic device to individually arrange each plant into the next nursery or into the greenhouse.

11. The method of farming plants of claim 1, wherein each nursery phase further comprises:
transplanting the plurality of plants to another plant tray.

12. The method of farming plants of claim 1, wherein the at least one greenhouse phase uses at least one of hydroponic, aquaponics, horticulture, and agronomy growing methods.

13. The method of farming plants of claim 1, wherein the one or more nursery phases use at least one of hydroponic, aquaponics, horticulture, and agronomy growing methods.

14. A system for farming plants, comprising:
one or more germination stations configured to receive a plurality of seeds or seedlings on one or more plant trays in a germination phase, wherein the plurality of seeds or seedlings grows into a plurality of plants during the germination phase;
one or more nurseries, wherein each of the one or more nurseries is configured to have a predetermined plant density;
a greenhouse, wherein the plurality of plants is arranged according to an optimized plant density identified from monitoring the plurality of plants within the one or more nurseries;
at least one sensor or monitoring device configured to identify a plurality of plant parameters including at least a plant size; and
a control unit configured to:
receive the plurality of plant parameters from the at least one sensor or monitoring device throughout each of the germination phase, a nursery phase, and at least one greenhouse phase,
control one or more systems relating to the plurality of plants, and
adjust a plurality of environmental parameters, wherein machine learning is used to optimize and control the plurality of environmental parameters, and the predetermined plant density of each nursery of the one or more nurseries and the optimized plant density of the greenhouse is determined based on the plant size identified by the at least one sensor or monitoring device during a previous phase and is determined to minimize an area between the plurality of plants.

15. The system for farming plants of claim 14, further comprising at least one of:
a germination robot configured to insert plants or plant seeds into one or more germination trays;
a transplanting robot configured to move plants from the one or more germination trays into the one or more nurseries; and
a transportation robot for moving the plants from the one or more nurseries into the greenhouse, wherein the germination, transplanting, and transportation robots are controlled by the control unit based on the plurality of plant parameters.

16. The system for farming plants of claim 15, wherein the one or more nurseries and the greenhouse comprise a plurality of plant vessels.

17. The system for farming plants of claim 14, wherein the plurality of plant parameters comprise plant density, weight, water content, nutrient content, and temperature.

18. The system for farming plants of claim 14, wherein the control unit is further configured to adjust at least one of plant density, a plurality of nutrients, an amount of water given to the plurality of plants, and a light intensity based on the plurality of plant parameters and a plant type.

19. The system for farming plants of claim 14, wherein the control unit is further configured to sense plant growth and implement algorithmic regression analysis to optimize a time spent in each of the nursery phase and the at least one greenhouse phase.

20. The system for farming plants of claim 14, wherein the plurality of plants further comprises a plurality of plant types, and the control unit is further configured to move each plant type of the plurality of plant types after a period of time specific to said plant type.

* * * * *